(12) United States Patent
Qin et al.

(10) Patent No.: US 7,763,839 B2
(45) Date of Patent: Jul. 27, 2010

(54) LUMINOUS INTENSITY LEVEL INDICATING DEVICE

(75) Inventors: Qiang Qin, Shenzhen (CN); Tian-You Liu, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 112 days.

(21) Appl. No.: 12/118,683

(22) Filed: May 10, 2008

(65) Prior Publication Data
US 2009/0230284 A1    Sep. 17, 2009

(30) Foreign Application Priority Data
Mar. 12, 2008    (CN) ................. 2008 1 0300542

(51) Int. Cl.
*H01J 40/14* (2006.01)
*G01J 1/32* (2006.01)

(52) U.S. Cl. .................. 250/214 R; 250/205

(58) Field of Classification Search ............ 250/214 R, 250/214.1, 205, 214 AL, 214 B, 214 D; 315/149–159; 340/539.26, 539.3; 327/514
See application file for complete search history.

(56) References Cited

U.S. PATENT DOCUMENTS 4,965,548 A * 10/1990 Fayfield .................. 340/511
2007/0187577 A1 * 8/2007 Kao .................... 250/214 SW

* cited by examiner

*Primary Examiner*—Thanh X Luu
*Assistant Examiner*—Pascal M Bui-Pho
(74) *Attorney, Agent, or Firm*—Frank R. Niranjan

(57) ABSTRACT

A luminous intensity measuring device includes a photoresistor, a number of voltage-dividing resistors, a plurality of comparators, a micro control unit (MCU), and an indicator. The photoresistor is connected to a current-limiting resistor in series between a direct current (DC) power supply and ground. The voltage-dividing resistors are connected in series, and together are connected parallel to the photoresistor and the current-limiting resistor located between the DC power supply and ground. A non-inverting node between the photoresistor and the current-limiting resistor is connected to the non-inverting input terminals of the comparators. The inverting terminals of the comparators are respectively connected to inverting nodes between every two adjacent voltage-dividing resistors. The output terminals of the comparators are connected to the input terminals of the MCU. The indicator is connected to the output terminals of the MCU. The MCU controls the indicator to indicate luminous intensity.

12 Claims, 1 Drawing Sheet

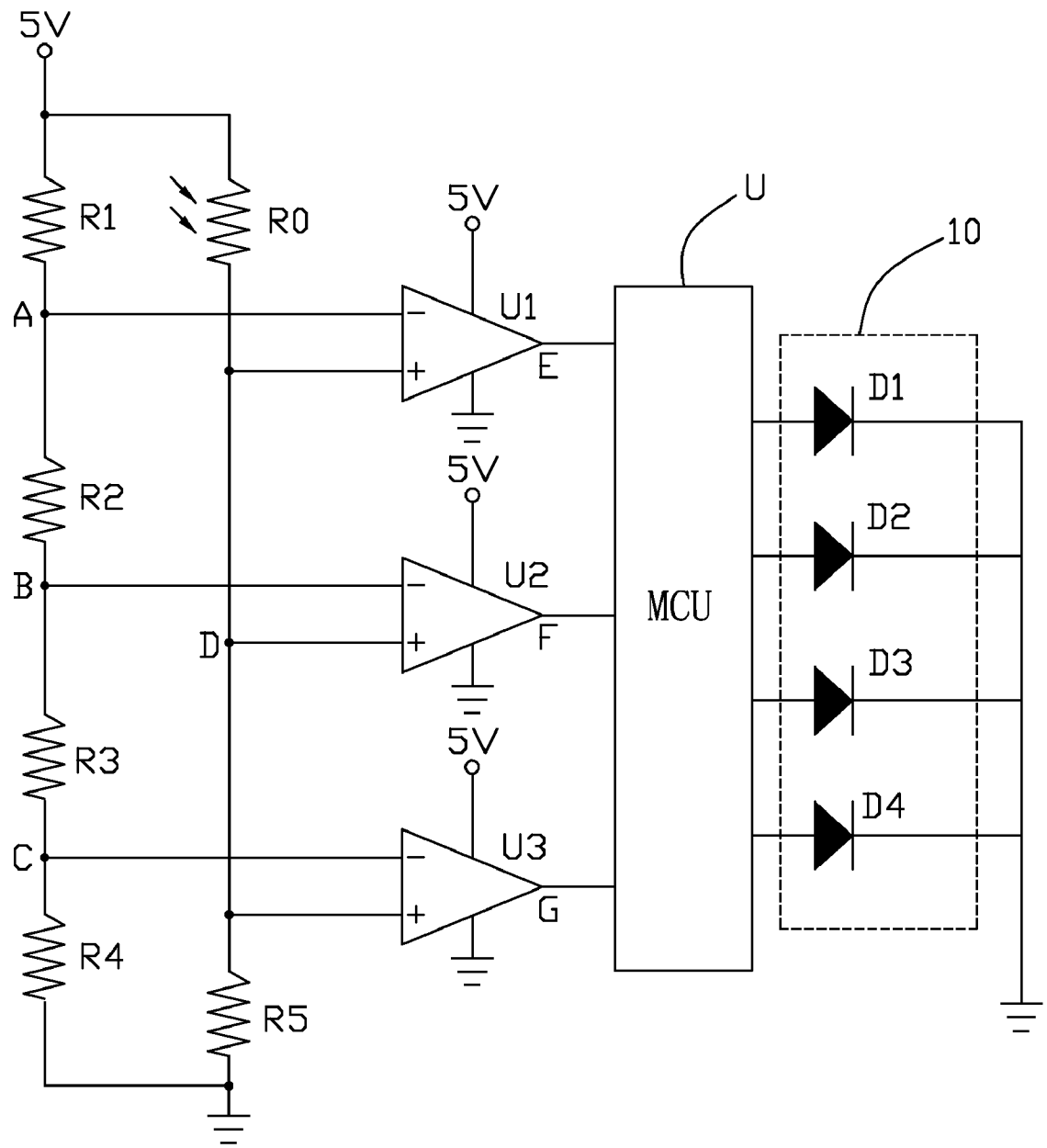

LUMINOUS INTENSITY LEVEL INDICATING DEVICE

BACKGROUND

1. Field of the Invention

The present invention relates to measuring devices, and particularly to a luminous intensity measuring device.

2. Description of Related Art

Generally speaking, a conventional luminous intensity measuring device includes a photoresistor and an A/D convertor. When measuring luminous intensity, the photoresistor senses illumination and transmits an analog signal to the A/D convertor. The A/D convertor converts the analog signal to a digital signal and transmits it to a processor to calculate the luminous intensity.

However, the A/D convertor is very expensive, thereby increasing the cost of the luminous intensity measuring device. In addition, the circuitry of the luminous intensity measuring device may be very complicated.

SUMMARY

An embodiment of a luminous intensity measuring device includes a photoresistor, a number of voltage-dividing resistors, a plurality of comparators, a micro control unit (MCU), and an indicator. The photoresistor is connected to a current-limiting resistor in series between a direct current (DC) power supply and ground. The voltage-dividing resistors are connected in series, and together are connected parallel to the photoresistor and the current-limiting resistor located between the DC power supply and ground. A non-inverting node between the photoresistor and the current-limiting resistor is connected to the non-inverting input terminals of the comparators. The inverting terminals of the comparators are respectively connected to inverting nodes between every two adjacent voltage-dividing resistors. The output terminals of the comparators are connected to the input terminals of the MCU. The indicator is connected to the output terminals of the MCU. The MCU controls the indicator to indicate luminous intensity.

Other advantages and novel features of the present invention will become more apparent from the following detailed description of an embodiment when taken in conjunction with the accompanying drawing, in which:

BRIEF DESCRIPTION OF THE DRAWING

The drawing is a circuit diagram of a luminous intensity measuring device in accordance with an embodiment of the present invention.

DETAILED DESCRIPTION

Referring to the drawing, a luminous intensity measuring device in accordance with an embodiment of the present invention includes a photoresistor R0, four voltage-dividing resistors R1-R4, a current-limiting resistor R5, three comparators U1-U3, a micro control unit (MCU) U, and an indicator 10.

The four voltage-dividing resistors R1-R4 are connected in series between a 5V direct current (DC) power supply and ground. The photoresistor R0 is connected in series to the current-limiting resistor R5 and together they are connected parallel to the resistors R1-R4 between the 5V DC power supply and ground. A non-inverting node D between the photoresistor R0 and the current-limiting resistor R5 is connected to the non-inverting input terminals of the comparators U1-U3. The inverting terminal of the comparator U1 is connected to an inverting node A between the voltage-dividing resistors R1 and R2. The inverting terminal of the comparator U2 is connected to an inverting node B between the voltage-dividing resistors R2 and R3. The inverting terminal of the comparator U3 is connected to an inverting node C between the voltage-dividing resistors R3 and R4. The output terminals E, F, and G of the comparators U1-U3 are respectively connected to three input terminals of the MCU U. The output terminals of the MCU U are connected to the indicator 10 to control the indicator 10 to indicate luminous intensity.

In this embodiment, the indicator 10 includes a green light-emitting diode (LED) D1, a yellow LED D2, a red LED D3, and a purple LED D4. The anodes of the LEDs D1-D4 are connected to the four output terminals of the MCU U. The cathodes of the LEDs D1-D4 are grounded. In other embodiments, the indicator 10 can be replaced with a computer display, a buzzer, an LCD, or other indicators according to need.

Voltages at the inverting nodes A, B, C, and the non-inverting node D are respectively denoted as Ua, Ub, Uc, and Ud. The voltage values Ua, Ub, and Uc can be adjusted by changing resistances of the voltage-dividing resistors R1-R4 according to need.

When the luminous intensity measuring device is used to measure luminous intensity of an area, the measuring device is placed at an appropriate position to have a clear view of the area. For example, if the luminous intensity measuring device is used to gauge the level or intensity of fire in a special area, then it is positioned to have an unobstructed view of the area. When there is no fire, the photoresistor R0 receives no illumination, therefore the resistance of the photoresistor R0 is very high. At this time, the voltage values Ua, Ub, Uc, and Ud satisfy the following formula: Ud<Uc<Ub<Ua. Therefore, the output terminals E, F, and G of the comparators U1-U3 will transmit low voltage signals to the MCU U. Then the MCU U controls the indicator 10 to show the corresponding result, for example, turning on the green LED D1.

When there are some fire present, such as during the initial stage of starting a controlled fire, the photoresistor R0 receives faint illumination, therefore the resistance of the photoresistor R0 is reduced. At this time, the voltage Ud increases and is greater than voltage Uc, but not greater than voltage Ub and voltage Ua. So the voltage values Ua, Ub, Uc, and Ud satisfy the following formula: Uc<Ud<Ub<Ua. Therefore, the output terminals E and F of the comparators U1 and U2 will transmit low voltage signals to the MCU U and the output terminal G of the comparator U3 will transmit a high voltage signal to the MCU U. Then the MCU U controls the indicator 10 to show the corresponding result, such as turning on the yellow LED D2 to indicate what could be called for example, a level one fire.

If and when the fire grows, the photoresistor R0 receives greater illumination, therefore the resistance of the photoresistor R0 is reduced further. At this time, the voltage Ud increases and is greater than voltage Uc and voltage Ub, but not greater than voltage Ua. So the voltage values Ua, Ub, Uc, and Ud satisfy the following formula: Uc<Ub<Ud<Ua. Therefore, the output terminal E of the comparator U1 will transmit low voltage signal to the MCU U and the output terminals F and G of the comparators U2 and U3 will transmit high voltage signals to the MCU U. Then the MCU U controls the indicator 10 to show the corresponding result, such as turning on the red LED D3 to indicate a level 2 fire.

Of course if the fire grows even more, the photoresistor R0 receives more illumination, therefore the resistance of the photoresistor R0 is reduced further. At this time, the voltage Ud increases and is greater than voltage Uc, voltage Ub, and voltage Ua. So the voltage values Ua, Ub, Uc, and Ud satisfy the following formula: Uc<Ub<Ua<Ud. Therefore, the output terminals E, F and G of the comparators U1-U3 will transmit high voltage signals to the MCU U. Then the MCU U controls the indicator 10 to show the corresponding result, such as turning on the purple LED D4, to indicate a level 3 fire. Therefore, users can know the status of their controlled fire according to the four LEDs D1-D4, and making decisions regarding control of the fire.

The above disclosed embodiment is but an example of the invention. In other embodiments the numbers of resistors and comparators can be increase or decreased for varying the levels of light measurement the invention can display.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A luminous intensity level indicating device comprising:
    a single photoresistor connected to a single current-limiting resistor in series between a direct current (DC) power supply and ground;
    a plurality of voltage-dividing resistors connected in series between the DC power supply and ground;
    a plurality of comparators, a non-inverting node between the single photoresistor and the single current-limiting resistor directly connected to the non-inverting input terminal of each of the comparators, the inverting terminals of the comparators respectively connected to inverting nodes between every two adjacent voltage-dividing resistors of the plurality of voltage-dividing resistors connected in series;
    a micro control unit (MCU), the output terminals of the comparators connected to input terminals of the MCU; and
    an indicator connected to output terminals of the MCU;
    wherein the resistance of the photoresistor is capable of being altered by environment illumination and able to change the voltage at the non-inverting node between the photoresistor and the current-limiting resistor, and the output terminals of the comparators adjusted according to voltage comparison between the inverting and non-inverting input terminals thereof, and then the MCU controlling the indicator to indicate different luminous intensity level.

2. The luminous intensity level indicating device as claimed in claim 1, wherein the indicator comprises a plurality of light-emitting diodes (LEDs), the anodes of the LEDs are connected to the output terminals of the MCU, the cathode of the LEDs are grounded.

3. The luminous intensity level indicating device as claimed in claim 2, wherein the LEDs have different colors to show different luminous intensity level.

4. The luminous intensity level indicating device as claimed in claim 1, wherein the voltage-dividing resistors comprise four voltage-dividing resistors, the comparators comprise three comparators.

5. A luminous intensity level indicating device comprising:
    a single photoresistor;
    two or more voltage-dividing resistors connected in a series between a direct current (DC) power supply and ground;
    two or more comparators, wherein each comparator comprises an inverting input, a non-inverting input and a comparator output;
    a single current-limiting resistor, wherein the single photoresistor is connected to the current-limiting resistor in series between the DC power supply and ground;
    one or more non-inverting nodes, wherein the non-inverting nodes are directly located between the photoresistor and the current-limiting resistor;
    one or more inverting nodes, wherein each of the inverting nodes are located between two adjacent voltage-dividing resistors connected in series;
    a micro control unit (MCU), wherein the two or more comparators are connected to the MCU; and
    an indicator, wherein the indicator is connected to the MCU, the MCU controls the indicator, the indicator comprises of a display and the indicator is capable of indicating different luminous intensity level of light incident on the photoresistor;
    wherein the photoresistor is capable of changing voltage at the one or more non-inverting nodes;
    wherein the comparators are capable of varying the comparator output by comparing voltage of the connected inverting node and the connected non-inverting node.

6. The luminous intensity level indicating device as claimed in claim 5, wherein the indicator comprises a plurality of light-emitting diodes (LEDs), the anodes of the LEDs are connected to output terminals of the MCU, the cathode of the LEDs are grounded.

7. The luminous intensity level indicating device as claimed in claim 6, wherein the LEDs have different colors to show different luminous intensity level.

8. The luminous intensity level indicating device as claimed in claim 5, wherein the voltage-dividing resistors comprise four voltage-dividing resistors, the comparators comprise three comparators.

9. A method for indicating luminosity level, the method comprising of:
    providing:
        a single photoresistor;
        two or more voltage-dividing resistors connected in a series between a direct current (DC) power supply and ground;
        two or more comparators, wherein each comparator comprises an inverting input, a non-inverting input and a comparator output;
        a single current-limiting resistor, wherein the single photoresistor is connected to the current-limiting resistor in series between the DC power supply and ground;
        one or more non-inverting nodes, wherein the non-inverting nodes are directly located between the single photoresistor and the single current-limiting resistor;
        one or more inverting nodes, wherein each of the inverting nodes are located between two adjacent voltage-dividing resistors connected in series;
        a micro control unit (MCU), wherein the two or more comparators are connected to the MCU; and
        an indicator, wherein the indicator is connected to the MCU, the MCU controls the indicator, the indicator comprises of a display and the indicator is capable of indicating different luminous intensity level of light incident on the photoresistor;

wherein the photoresistor changes the voltage at the one or more non-inverting nodes in response to exposure to light;

wherein the comparators vary the comparator output by comparing voltage of the connected inverting node and the connected non-inverting node.

10. The method as claimed in claim 9, wherein the indicator comprises a plurality of light-emitting diodes (LEDs), the anodes of the LEDs are connected to output terminals of the MCU, the cathode of the LEDs are grounded.

11. The method as claimed in claim 10, wherein the LEDs have different colors to show different luminous intensity level.

12. The method as claimed in claim 9, wherein the voltage-dividing resistors comprise four voltage-dividing resistors, the comparators comprise three comparators.

* * * * *